(12) United States Patent
Nelson et al.

(10) Patent No.: US 11,934,802 B2
(45) Date of Patent: *Mar. 19, 2024

(54) SYSTEM AND METHOD FOR WORKFLOW APPLICATION PROGRAMMING INTERFACES (APIS)

(71) Applicant: ServiceNow, Inc., Santa Clara, CA (US)

(72) Inventors: Harry Thomas Nelson, San Diego, CA (US); Matthew Breckenridge Stoddart, San Diego, CA (US); Stuart Dean Swope, San Diego, CA (US); David Tamjidi, San Diego, CA (US); Venkata Kiran Kumar Koya, Poway, CA (US); Joshua Timothy Nerius, Chicago, IL (US); Rebecca Anita Dias, Seattle, WA (US)

(73) Assignee: ServiceNow, Inc., Santa Clara, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/301,055

(22) Filed: Mar. 23, 2021

(65) Prior Publication Data

US 2021/0208853 A1    Jul. 8, 2021

Related U.S. Application Data

(63) Continuation of application No. 16/133,438, filed on Sep. 17, 2018, now Pat. No. 10,970,048.

(51) Int. Cl.
*G06F 8/34* (2018.01)
*G06F 8/20* (2018.01)
(Continued)

(52) U.S. Cl.
CPC ............... *G06F 8/34* (2013.01); *G06F 8/22* (2013.01); *G06F 8/36* (2013.01); *G06Q 10/067* (2013.01)

(58) Field of Classification Search
CPC ...... G06F 8/22; G06F 8/34–36; G06Q 10/067
See application file for complete search history.

(56) References Cited

U.S. PATENT DOCUMENTS 6,321,229 B1    11/2001   Goldman
6,609,122 B1     8/2003   Ensor
(Continued)

OTHER PUBLICATIONS

Author unknown, Stateflow for State Diagram Modeling User's Guide Version 4, published by The Mathworks, pp. 1-652 (Year 2001).

(Continued)

*Primary Examiner* — S. Sough
*Assistant Examiner* — Zheng Wei
(74) *Attorney, Agent, or Firm* — Fletcher Yoder, PC

(57) ABSTRACT

A computing system includes a server. The server is communicatively coupled to a data repository and is configured to store a data in the data repository. The server is further configured to create, via a visual information flow creation tool, at least one information flow object, wherein the at least one information flow object comprises a flow, a sub-flow, an Action, or a combination thereof. The server is also configured to interface with the at least one information flow object via a front-end application programing interface (API), a back-end API, or a combination thereof. The server is additionally configured to execute the at least one information flow object via the front-end API, the back-end API, or a combination thereof, and to retrieve results obtained by executing the at least one information flow object via the front-end API, the back-end API, or the combination thereof.

20 Claims, 10 Drawing Sheets

(51) Int. Cl.
*G06F 8/36* (2018.01)
*G06Q 10/067* (2023.01)

(56) References Cited

U.S. PATENT DOCUMENTS

| | | |
|---|---|---|
| 6,678,887 B1 | 1/2004 | Hallman |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 6/2006 | Warpenburg |
| 7,170,864 B2 | 1/2007 | Matharu |
| 7,350,209 B2 | 3/2008 | Shum |
| 7,392,300 B2 | 6/2008 | Anantharangachar |
| 7,454,659 B1 | 11/2008 | Gaudette |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 8/2014 | Kowalski |
| 8,812,539 B2 | 8/2014 | Milousheff |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,300,759 B1 * | 3/2016 | Jorgensen .............. G06F 9/54 |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,613,969 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 10,055,202 B2 * | 8/2018 | Peed ..................... G06F 8/36 |
| 2002/0138543 A1 * | 9/2002 | Teng .................. G06Q 10/06 |
| | | 707/E17.005 |
| 2005/0016039 A1 | 1/2005 | Szpak |
| 2006/0293934 A1 * | 12/2006 | Tsyganskiy ............ G06F 8/34 |
| | | 705/7.29 |
| 2008/0263516 A1 | 10/2008 | Hatadinata |
| 2010/0141980 A1 | 6/2010 | Ito |
| 2012/0271854 A1 * | 10/2012 | Truong ................ G06F 21/41 |
| | | 707/E17.005 |
| 2013/0167126 A1 * | 6/2013 | Iyer ..................... G06F 9/4843 |
| | | 718/102 |
| 2013/0238384 A1 * | 9/2013 | Caesar .................. G06F 8/34 |
| | | 705/7.27 |
| 2015/0170088 A1 | 6/2015 | Rizk |
| 2016/0054982 A1 * | 2/2016 | Itani ..................... G06F 8/20 |
| | | 717/105 |
| 2019/0050771 A1 * | 2/2019 | Meharwade ........ G06Q 10/067 |
| 2019/0129764 A1 * | 5/2019 | Johnson ................ G06N 7/01 |
| 2019/0213326 A1 * | 7/2019 | Dykes ................ G06F 21/552 |
| 2019/0317801 A1 * | 10/2019 | Chiang ............... G06F 9/4843 |

OTHER PUBLICATIONS

Author unknown, Stateflow for Usee with Simulink User's Guide Version 2, published by The Mathworks, pp. 1-413 (Year 1999).

Author unknown, Real-Time Workshop for User with Simulink User's Guide Version 3, published by The Mathworks, pp. 1-386 (Year 1999).

Han et al., "A RESTful Approach to the Management of Cloud Infrastructure", published by 2009 IEEE International Conference on Cloud Computing, pp. 139-142 (Year 2009).

Cholia et al., "NEWT: A RESTful Service for Building High Performance Computing Web Applications", published by IEEE, pp. 1-11 (Year 2011).

Al-Zoubi et al., "Performing Distributed Simulation With Erstful Web-Services", published by IEEE, Proceedings of the 2009 Winter Simulation Conference, pp. 1323-1334 (Year 2009).

\* cited by examiner

SYSTEM AND METHOD FOR WORKFLOW APPLICATION PROGRAMMING INTERFACES (APIS)

CROSS-REFERENCE

This application is a continuation of U.S. application Ser. No. 16/133,438, entitled, "SYSTEM AND METHOD FOR WORKFLOW APPLICATION PROGRAMMING INTERFACES," filed Sep. 17, 2018, which will issue on Apr. 6, 2021 as U.S. Pat. No. 10,970,048 and which is herein incorporated by reference in its entirety for all purposes.

BACKGROUND

The present disclosure relates generally to workflows and, more particularly, to custom workflow Application Programming Interfaces (APIs).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Within the context of cloud computing solutions for data repositories, users may be asked to deal with ever increasing amounts of data, e.g., including certain date-based information stored in the data repositories. In fact, the amount of cloud-based and date-based data collected and stored in today's cloud computing solutions, such as cloud-based repositories, may be orders of magnitude greater than what was historically collected and stored. Users tasked with automating and/or troubleshooting enterprise, IT, and/or other organization-related functions (e.g., incident tracking and/or help desk-related functions) navigate ever increasing amounts of date-based data to properly and efficiently perform their job functions. In certain embodiments, cloned data repositories may be created. With this in mind, the following embodiments are directed to improving the manner in which information workflows in certain data repositories may be automated, including cloned data repository information workflows.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. The current embodiments enable systems and methods that may create information flows (e.g., workflows) executable in one or more instances or clones by using certain application programming interfaces (APIs). The creation of information flows may be performed by users that are not programmers or information technology personnel. For example, in certain embodiments, software tools may be used that visually present a flow of information, e.g. a flow chart view, and that enable a user to graphically manipulate the "flow" to perform desired processing, as further described below. That is, rather than entering computer code by typing text, for example, the software tools may enable the user to "draw" a flow chart which may then be executed. Accordingly, written computer code, such as Java, JavaScript, and so on, may be avoided and visual flows used instead.

The flows may include "sub-flows", "Actions", and "Steps", as further described below. The techniques described herein may provide for both server side as well as front-end "Flow APIs" that are suitable for executing the flows, sub-flows, Actions, and/or Steps. In some embodiments, the Flow APIs may enable asynchronous execution. That is, the flows, sub-flows, Actions, and/or Steps may execute in an asynchronous or non-blocking manner, thus other work may be performed, resulting in improvements in efficiency and in the utilization of resources. The Flow APIs may also provide for enhanced security, for example, by using access control lists (ACLs) to verify permissions. By providing for more efficient and secure reuse of flows, sub-flows, Actions, and Steps, the Flow APIs may thus enable improved data processing and use across a larger organizational spectrum.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
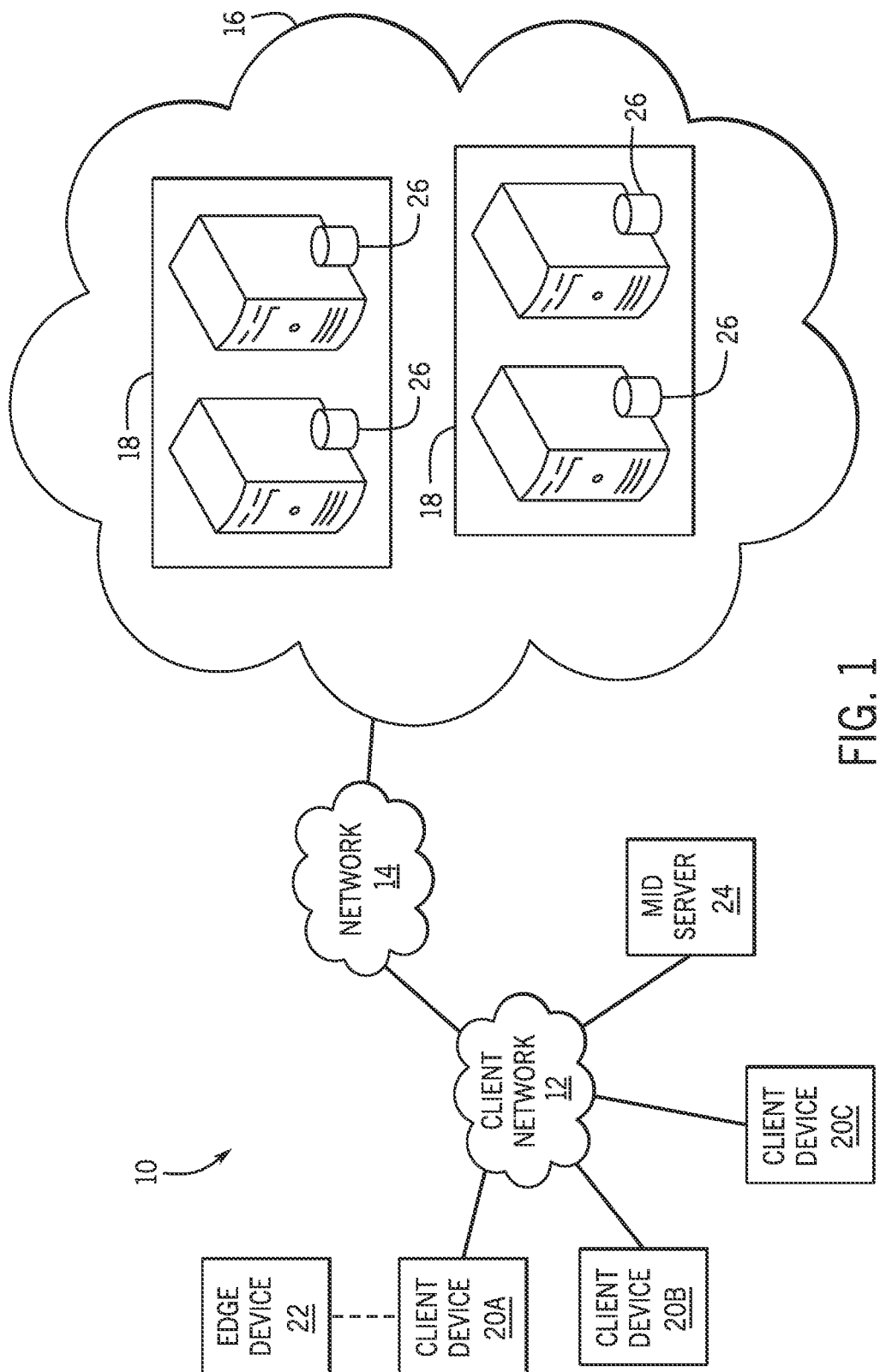
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device that includes, but is not limited to a computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system.

Example embodiments of an application include software modules, software objects, software instances and/or other types of executable code.

As used herein, the term "flow" may refer to data processing of information (e.g., database records) that may be presented to a user in a flow chart-like view. A flow may have inputs but may not have an output. A flow may include one or more "sub-flows" and/or one or more "Actions." The flow may also include "triggers" and control logic. A "sub-flow" as used herein may refer to data processing of information (e.g., database records) also presented to the user in a flow chart-like view. Unlike the flow, a sub-flow may have both inputs and outputs. A sub-flow may additionally contain Actions, triggers, control logic and/or other sub-flows. A "trigger" may be "fired" or turned on by a changes in certain conditions, such as a change in one or more database records. The trigger may also be "fired" or otherwise turned on via a schedule, e.g., daily, weekly, monthly schedule. "Action" as used herein may include one or more "Steps." Steps may be self-contained code, such as scripts (e.g., Java, JavaScript code) provided by the manufacturer of the software tools used to create the flows, sub-flows, and the like. Steps may also be provided by users and any other entity. As used herein, the terms "flow objects" may refer to flows, sub-flows, Actions, and Steps.

Present embodiments are directed to enabling the reuse of flow objects via APIs. The APIs that may call and work with the flow objects may be referred to herein as with the term "Flow" APIs. The Flow APIs may include a back-end (e.g., server-side) API and a front-end (e.g., client-side API). The server-side API may include scriptable object(s) which may act as an API interface for all server-side code, e.g., server-side scripting code. The front-end API may enable front-end computing systems, such as web browsers, to use an implementation, such as a REST (Representational State Transfer) implementation of the Flow APIs, thus providing a more easy to use client for end-user access through a REST service. As referred to herein, "REST" may include a web-based Remote Process Call (RPC) system based on the work (e.g., Ph.D. thesis) of Roy Fielding. It is to be noted that in other embodiments any RPC system may be used, including Simple Object Access Protocol (SOAP)-based systems, JavaScript Object Notation (JSON)-based systems, XML-based systems, and so on. The Flow APIs may also provide for asynchronous execution of flow objects, for example, via push style delivery of outputs as further described below.

With the preceding in mind, the following figures relate to various types of generalized system architectures or configurations that may be employed to provide services to an organization accessing a cloud-platform, such as may be embodied in a multi-instance or multi-tenant framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 in which embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, in order to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

The virtual servers 26 may store or access a variety of data, including data that may have date-based information. For example, manufacturing data, financial data, farming data, company operations data, accounting data, and so on, may be include date-based information specifying one or more points in time associated with the data. Indeed, dates of manufacture, dates of sale, dates of incidents, expiration dates, scheduled dates, and so on, may be stored in the virtual servers 26. The virtual servers 26 may then use the techniques described herein to provide for one or more calendars for data having-based information, including custom calendars.

To utilize computing resources within the platform 16, network operators may choose to configure the data centers 18 using a variety of computing infrastructures. In one embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
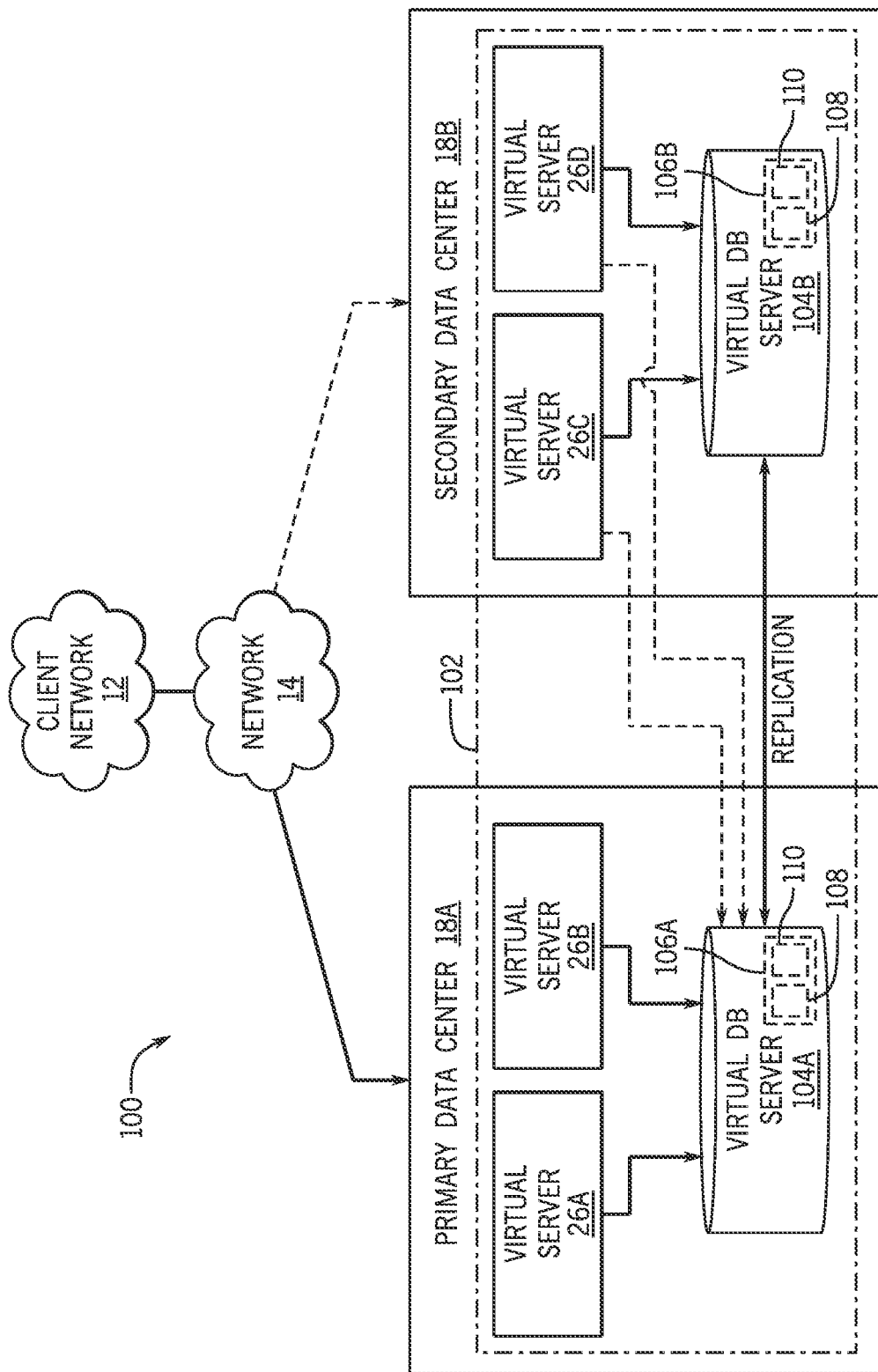
FIG. 2 is a block diagram of a computing device utilized in the distributed computing system of FIG. 1, in accordance with an embodiment.

FIG. 2 is a schematic diagram of an embodiment of a multi-instance cloud architecture 40 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a simply client instance 102) is associated with (e.g., supported and enabled by) dedicated virtual servers 26 (e.g., virtual servers 26A, 26B, 26C, and 26D) and dedicated database servers (e.g., virtual database servers 104A and 104B). Stated another way, the virtual servers 26A, 26B, 26C, 26D and virtual database servers 104A, 104B are not shared with other client instances but are specific to the respective client instance 102. Other embodiments of the multi-instance cloud architecture 100 could include other types of dedicated virtual servers, such as a web server. For example, the client instance 102 could be associated with (e.g., supported and enabled by) the dedicated virtual servers 26A, 26B, 26C, 26D, dedicated virtual database servers 104A, 104B, and additional dedicated virtual web servers (not shown in FIG. 2).

In the depicted example, to facilitate availability of the client instance 102, the virtual servers 26A, 26B, 26C, 26D and virtual database servers 104A, 104B are allocated to two different data centers 18A, 18B, where one of the data centers 18 acts as a backup data center 18. In reference to FIG. 2, data center 18A acts as a primary data center 18A that includes a primary pair of virtual servers 26A, 26B and the primary virtual database server 104A associated with the client instance 102, and data center 18B acts as a secondary data center 18B to back up the primary data center 18A for the client instance 102. To back up the primary data center 18A for the client instance 102, the secondary data center 18B includes a secondary pair of virtual servers 26C, 26D and a secondary virtual database server 104B. The primary virtual database server 104A is able to replicate data to the secondary virtual database server 104B.

As shown in FIG. 2, the primary virtual database server 104A may replicate data to the secondary virtual database server 104B using, e.g., a Master-Master MySQL Binlog replication operation. The replication of data between data could be implemented by performing full backups weekly and daily incremental backups in both data centers 18A, 18B. Having both a primary data center 18A and secondary data center 18B allows data traffic that typically travels to the primary data center 18A for the client instance 102 to be diverted to the second data center 18B during a failure and/or maintenance scenario. Using FIG. 2 as an example, if the virtual servers 26A, 26B and/or primary virtual database server 104A fails and/or is under maintenance, data traffic for client instances 102 can be diverted to the secondary virtual servers 26C, 26D and the secondary virtual database server instance 104B for processing.

In the depicted embodiment, a database server, such as the servers 104A and/or 104B, may each include a flow data processing system 106. That is, the flow data processing system 106 may enable the creation of flow objects and then provide access (e.g. execution, status checks, and retrieval of outputs) of the flow objects via a front-end Flow API 108 and a back-end Flow API 110. The techniques described herein may allow the creation of custom flow objects and then the subsequent execution, status check, and receipt of output from the flow objects via the front-end Flow API 108 and the back-end Flow API 110. The front-end Flow API 108 may be provided for use by front-end clients, such as web browsers, mobile apps (e.g., smart phone apps), and the like. The back-end Flow API 110 may be provided for use by back-end clients that may be under the supervision, for example, of an information technology (IT) group. By providing for the front-end Flow API 108 and the back-end Flow API 110, the techniques described herein may enable a more efficient and useful reuse of flow objects, as further described herein.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server. Using FIG. 2 as an example, the virtual servers 26A, 26B, 26C, 26D and virtual database servers 104A, 104B may be combined into a single virtual server. The use and discussion of FIGS. 1 and 2 are only examples to facilitate ease of description and explanation of discrete or functional concepts and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
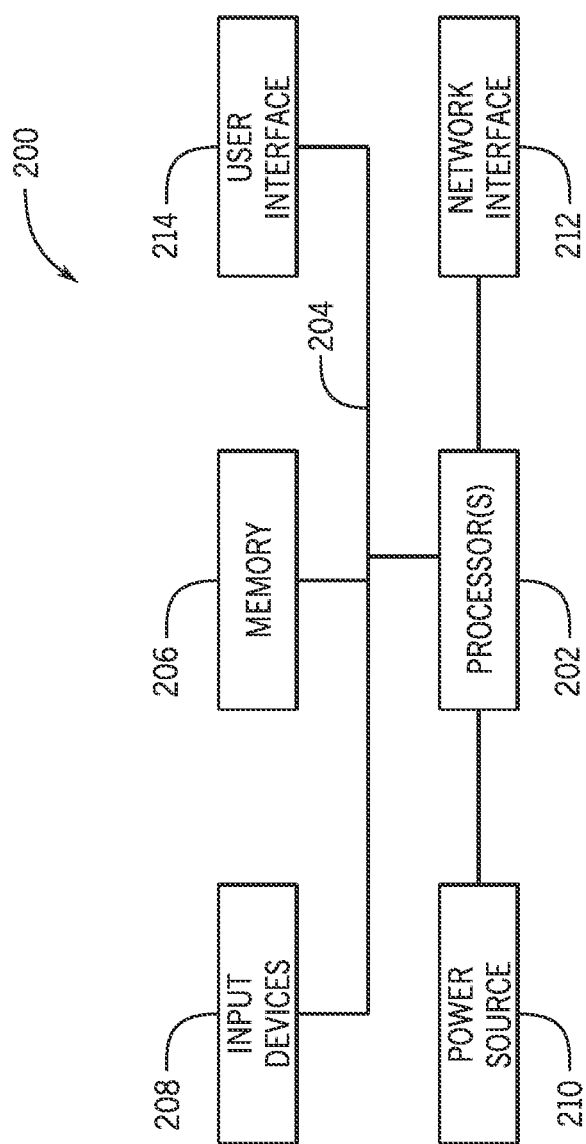
FIG. 3 is a block diagram of an embodiment of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 includes suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processor 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
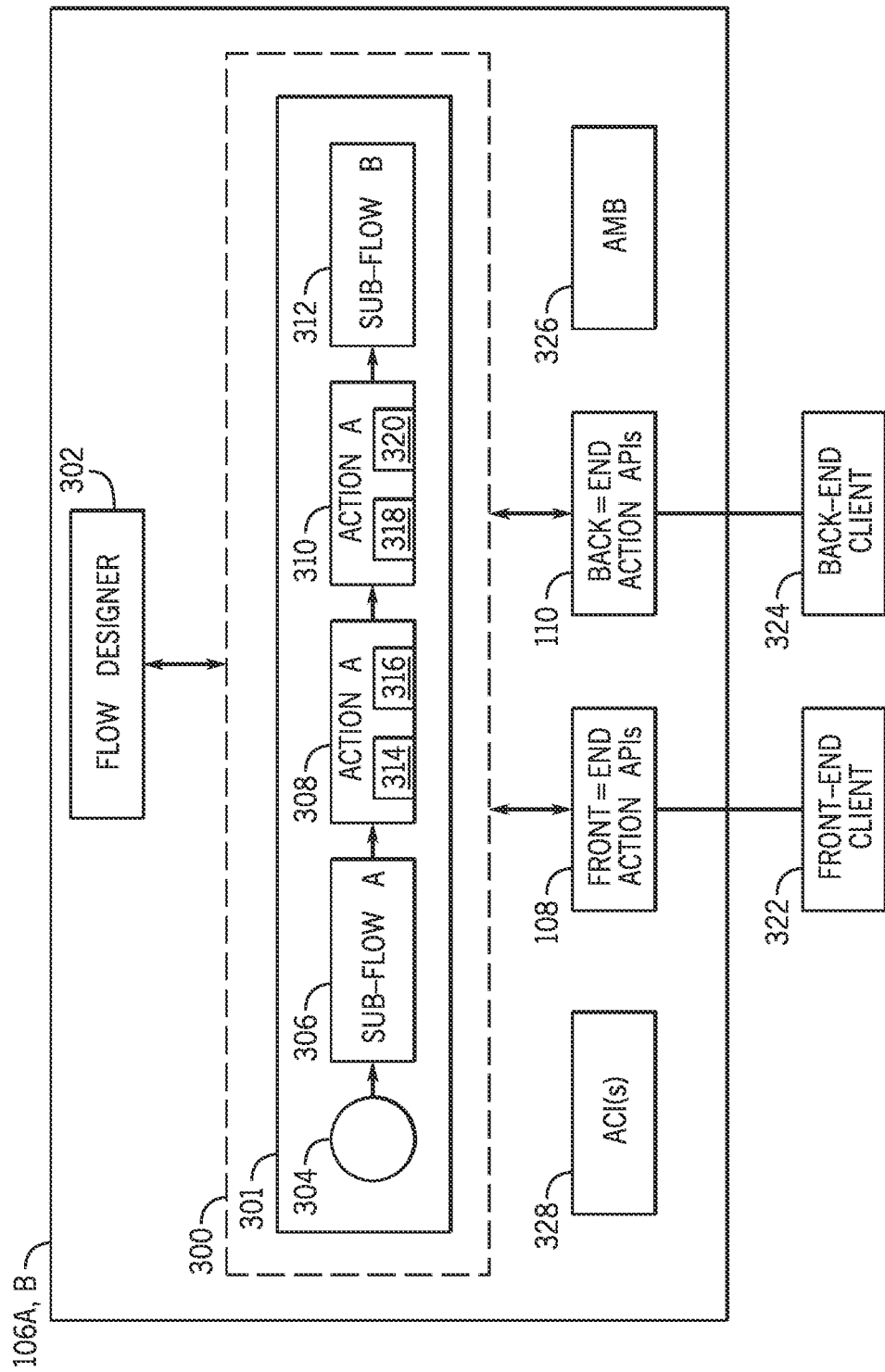
FIG. 4 is a block diagram illustrating a flow data processing system suitable for creating custom flow objects and for executing the flow objects via front-end and back-end flow application programming interfaces (APIs), in accordance with an embodiment.

Turning now to FIG. 4, the figure is a block diagram illustrating an embodiment of the flow data processing system 106 suitable for creating flow objects 300 and for accessing the flow objects 300 via the front-end Flow API 108 and the back-end Flow API 110. It is to be understood that the flow data processing system 106 depicted is an example only and may be included in or implemented using one or more of the virtual servers 26, the virtual DB servers 104, or a combination thereof. In the depicted embodiment, the flow data processing system 106 includes a flow designer system 302, e.g., a visual information flow creation tool. The flow designer system 302 may provide for visual programming via natural languages as opposed to entering text representative of a computer program. The flow designer system 302 may include executable code or computer instructions suitable for creating, managing, accessing, and/or editing the flow objects 300. In the depicted embodiment, a single flow 301 is shown in the flow objects 300. It is to be understood that more than one flow may be provided in the flow objects 300.

The flow 301 may include a trigger 304 which may be "fired" or otherwise turned on by certain changed condition, such as a change in one or more records stored in a database (e.g., stored in the virtual DB servers 104). The trigger 304 may additionally be "fired" periodically, for example, as part of a schedule (e.g., hourly schedule, daily schedule, weekly schedule, monthly schedule, and so on). The trigger 304 may thus be used to initiate execution of other flow objects 300, such as sub-flow 306, Action 308, Action 310, and sub-flow 312.

In the depicted embodiment, the trigger 304 initiates execution of the sub-flow 306. The sub-flow 306 may include Actions, control logic (e.g., Boolean logic, branching logic, termination logic), other sub-flows, and so on. The sub-flow 306 may additionally take in inputs and provide outputs. For example, output of the sub-flow 306 may be used as input to the Action 308. The Action 308 may use the inputs provided to execute Steps 314, 316. The Action 308 may also include control logic. As mentioned earlier, Steps, such as the Steps 314, 316, and may be self-contained code, such as scripts (e.g., Java, JavaScript code) provided by the manufacturer of the flow designer system 302. As an example, the flow and/or action designer system(s) 302 may be provided by ServiceNow™ Inc., of Santa Clara, California, U.S.A., under the name Flow Designer™. The Steps 314, 316 may be additionally or alternatively provided by other third parties and/or coded by certain users, such as IT users.

Steps may include any number of functionality, such as requesting approval from other users of the servers 26, 104, creating records in a database table, editing the record in the database table, deleting the records in the database table, creating server tasks, logging messages, looking up database information, notifying of certain events (e.g., incidents, change requests, problems, changes to user records), executing scripts, such as JavaScript, sending REST web service requests, sending email, waiting for a condition to occur, and so on. Action 310 may execute following Action 308. In turn, Action 310 may include Steps 318, 320, and upon completion of Step 320, sub-flow 312 may be executed. Once sub-flow 312 finishes execution, the flow 301 finishes. As noted earlier, the flows, such as the flow 301, may not have outputs.

The flows may be executable from external clients, such as a front-end client 322 (e.g., executable via device 20) and a back-end client 324 (e.g., executable via servers 26 and/or 104). More specifically, the front-end client 322 may interface with the flow objects 300 via the front-end Flow API 108 and the back-end client may interface with the flow objects 300 via the back-end Flow API 110. Each API 108, 110 may include three or more function types as follows:

Function 1) Call Action/Sub-flow/Flow (Inputs: Object ID, Array of input Arguments)—Output: ExecutionID. This API function type executes a desired Action, sub-flow, or flow, and uses a list of inputs, including the flow object's identification (ID), and an array of input arguments. The array of input arguments may include numeric values, text, characters, Unicode, and so on. Once executed, the Call Action/Sub-flow/Flow API may result in an asynchronous execution of the given Action, sub-flow, or flow. In certain embodiments, the response of the asynchronous execution may be provided by an asynchronous message bus (AMB) system 326. For example, the AMB system 326 may be in charge of managing the delivery of the response of the asynchronous execution of the flow objects 300 and interacting with the APIs 108, 110 based on the asynchronous execution. Outputs for the Call Action/Sub-flow/Flow may include a "handle" or unique identifier (e.g., ExecutionID) uniquely identifying the executing Action, sub-flow, and/or flow. As used herein, Function 1 types may include Call Action ( . . . ), Call Sub-flow ( . . . ), and Call Flow ( . . . ).

Function 2) Check Action/Sub-flow/Flow Execution Status (Inputs: ExecutionID)—Output: Execution status. This API function type may be provided to derive the current status of the executing Action, sub-flow, and/or flow. For example, given an input such as the previously received ExecutionID (e.g., received via the Call Action/Sub-flow/Flow API described above), the Check Action/Sub-flow/Flow API may then return an execution status, such as "executing", "execution completed", and so on. As used herein, Function 2 types may include Check Action ( . . . ), Check Sub-flow ( . . . ), and Check Flow ( . . . ).

Function 3) Retrieve Action/Sub-flow/Flow Outputs (Inputs: ExecutionID)—Output: Array of output Arguments. This API function may be used to retrieve outputs of the previously executed Call API. That is, once the Call API is completed, the Retrieve API may then be called, using the ExecutionID previously described, to retrieve any outputs of the Call API. As used herein, Function 3 types may include Retrieve Action ( . . . ), Retrieve Sub-flow ( . . . ), and Retrieve Flow ( . . . ).

As previously noted, each of the three API function types listed above may be provided for the front-end API 108 and/or for the back-end API 110. However, some changes may be made. For example, in certain embodiments, the front-end API 108 may be using a REST implementation, as further described below in FIG. 5, and may also use the AMB 326. Likewise access control lists (ACLs) 328 may be used to provide for certain secure data processing. For example, the ACLs 328 may be queried to verify that the clients 322 and/or 324 have proper authorization to execute the different Flow APIs for certain flow objects 300. It is to be understood that the AMB 326 and the ACLs 328 may, in certain embodiments, be disposed in systems outside of the flow data processing system 106 but may then operatively coupled to the flow data processing system 106. By using the three API function types listed above, the techniques described herein may provide for improved execution and reuse of the flow objects 300. Indeed, any computing system may use the APIs 108, 110 to use flow objects 300, such as flows, Actions, sub-flows, steps, and the like, which may have been created via the flow designer tool 302.

Figure 5:
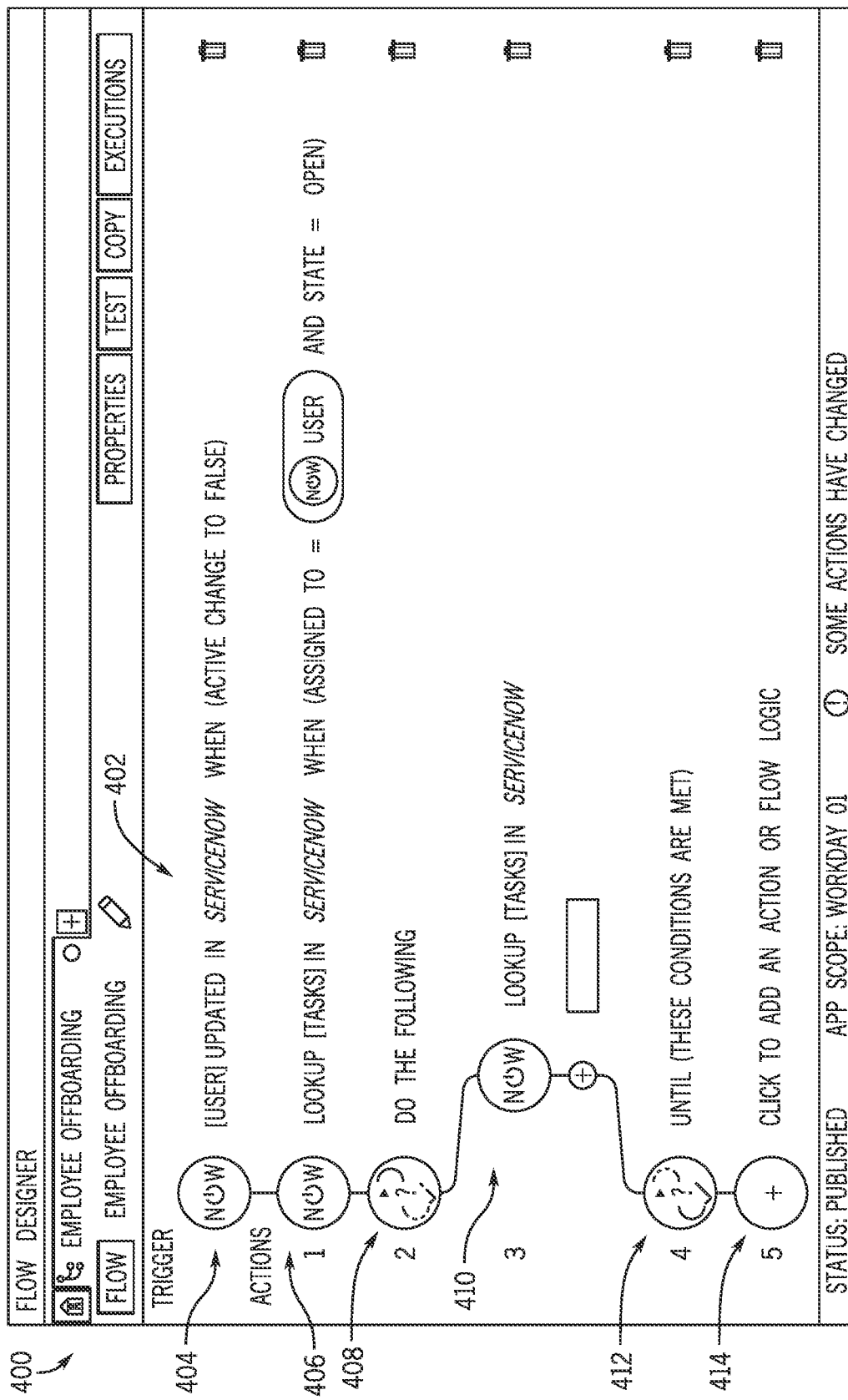
FIG. 5 is a screenshot of an embodiment of a graphical user interface (GUI) suitable for creating and/or editing flow objects, in accordance with an embodiment.

FIG. 5 is a screenshot depicting an embodiment of a graphical user interface (GUI) 400 suitable for inputting certain flow objects 300 into a flow, such as the flow 301. The GUI 400 may be included in the flow and/or action designer system 302 and used to create the flow 301. In the depicted embodiment, a graphical flow view 402 of a flow is shown. Indeed, the GUI 400 may be used to create and edit any number of graphical flow views that may then be executed as flow objects 300 via the front-end Flow API 108 and/or the back-end Flow API 110.

In the depicted embodiment, the graphical flow view 402 may start execution via a trigger 404. More specifically, if a certain user record is updated, then the trigger 404 may "fire" and execute Action 406. The Action 406 may then retrieve a set of tasks assigned to the updated user that have an open state. The retrieved tasks may then be further process via a "Do . . . Until" control logic. More specifically, a Do logic 408 may execute one or more Actions, such as Action 410, until the "Until" control logic 410 has its conditions met. More sub-flows and/or Actions may be added, for example, via the "+" control 414. As shown, natural language and visual composition via the flow designer 302 may be used to enable the creation of executable flow objects 300. The flow objects 300 may then be reused by the front-end client 322 and/or the back-end client 324.

Figure 6:
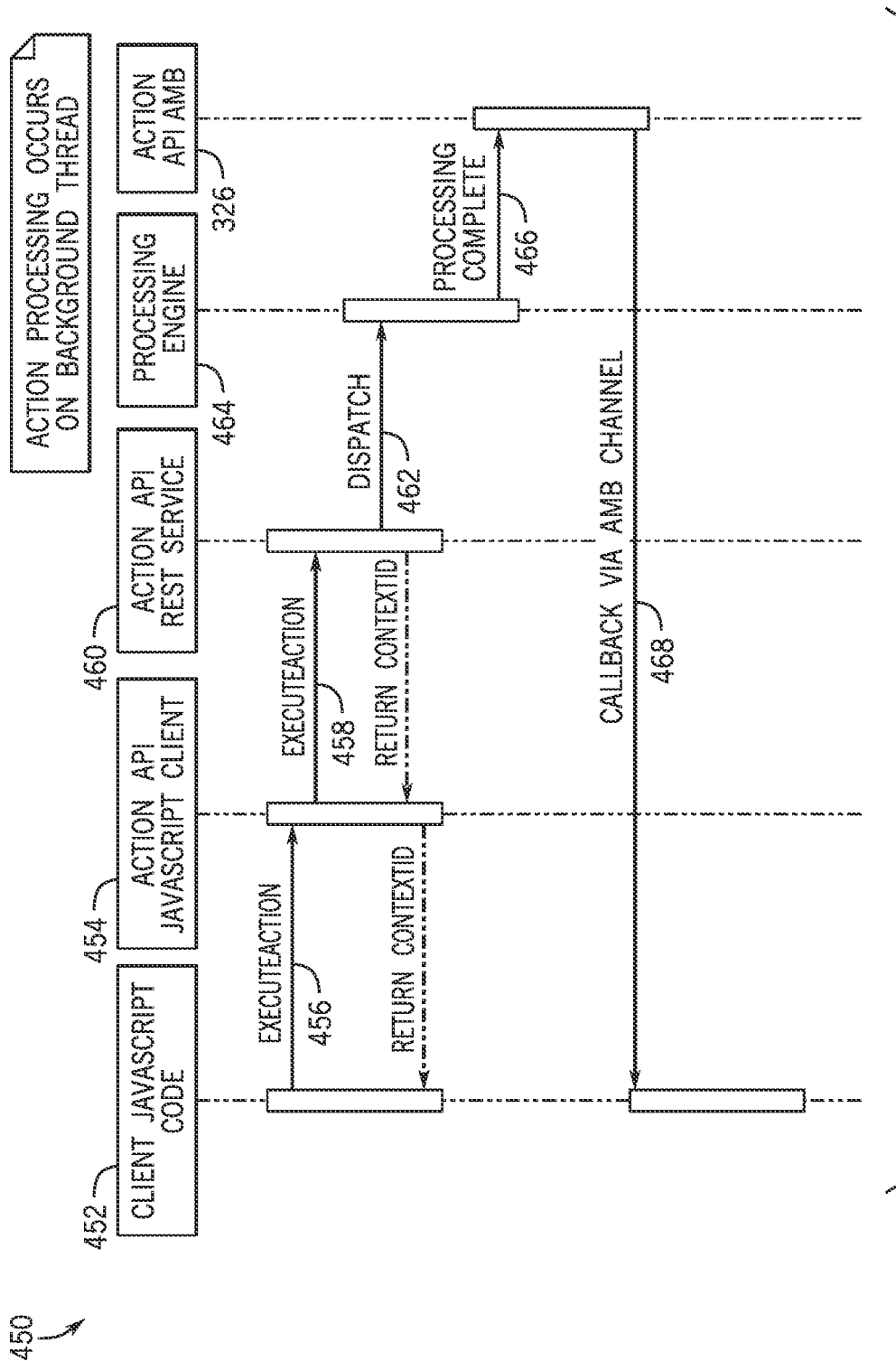
FIG. 6 is an interaction overview diagram illustrating embodiments of interactions between certain components of front-end flow APIs and a client-side code.

Turning now to FIG. 6, the figure is an interaction overview diagram illustrating embodiments of interactions 450 between certain components of the front-end Flow API 108 and a client-side code implementation 452. In the depicted embodiment, the client-side code 452 (e.g., JavaScript code) may be executable, for example, via a web browser of the front end client 322, and may interact with a script client API 454 (e.g., JavaScript client) included in the front-end Flow API 108. For example, the client-side code 452 may execute 456 a call to the Call Action function of the Flow API (e.g., Function 1 above) included in the script client API 454. In turn, the script client API 454 may execute 458 a Flow API REST Service request 460 also included in the front-end Flow API 108. The Flow API REST Service request 460 may then dispatch 462 the request to a processing engine 464.

The processing engine 464 may process the dispatch 462 to execute the chosen flow object(s) 300, such as by executing an Action. The processing engine 464 may execute the Action asynchronously, e.g., in a background thread. When the Action's processing is complete 466, the AMB 326 may notify the client-side code 452 via a callback 468. More specifically, a callback function included in the client-side code 452 may be executed by the AMB 326 once the processing completes 466. The client-side code 452 may then execute, for example, the Retrieve Flow API (e.g., Function 3 above) to get results from execution of the flow object(s) 300. It is to be noted that the client-side code 452 and the script client API 454 may be implemented in a number of computer languages in addition to or alternative to JavaScript. It is also to be understood that while the depicted figure shows Actions as the executable flow object 300, other embodiments may use other flow objects 300, such as flows and/or sub-flows.

Figure 7:
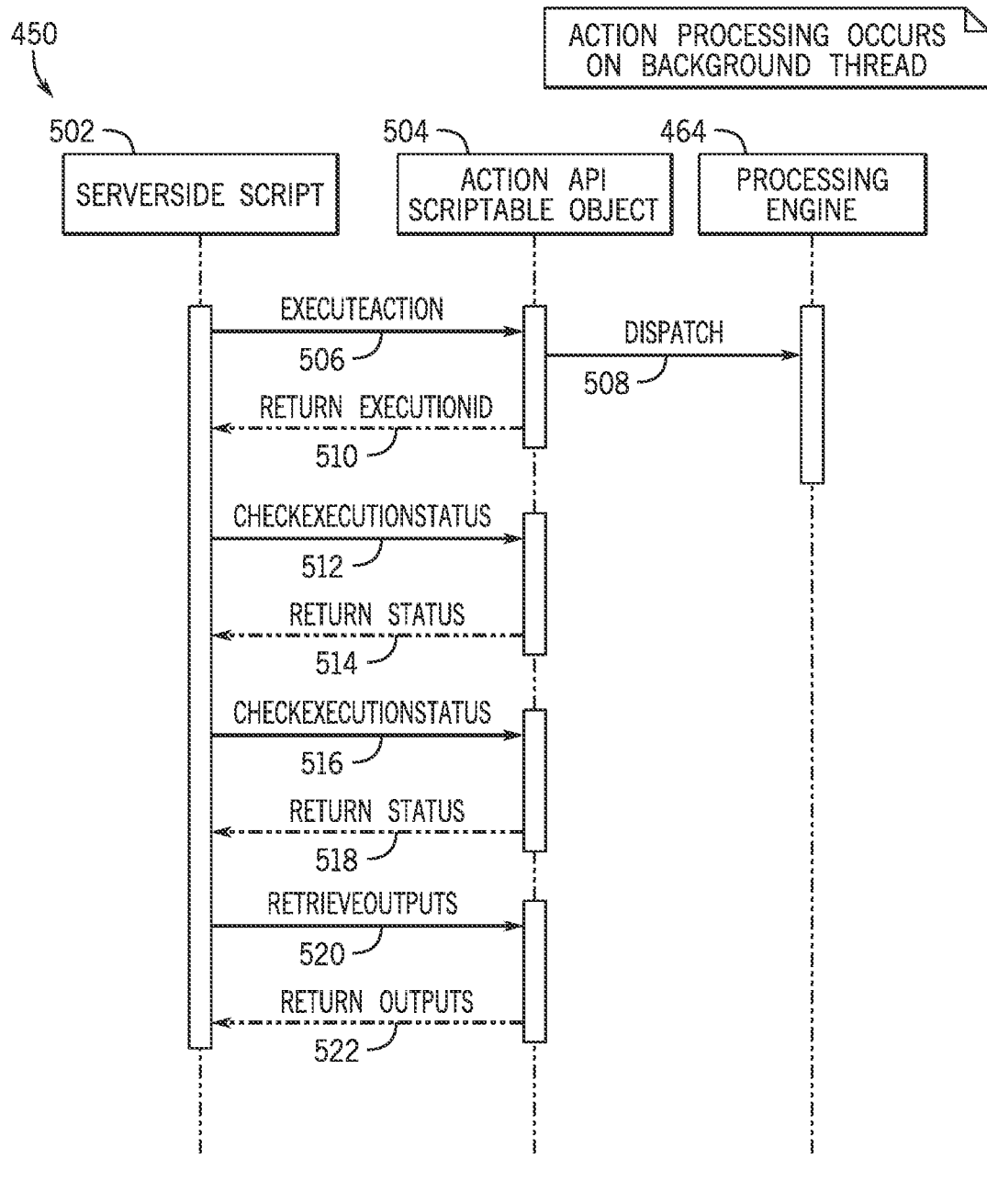
FIG. 7 is an interaction overview diagram illustrating embodiments of interactions between certain components of back-end flow APIs and a server-side code.

FIG. 7 is an interaction overview diagram illustrating embodiments of interactions 500 between certain components of the back-end Flow API 110 and a server-side code 502. The server-side code 502 may be executable by the back-end client 324, for example, via the servers 26 and/or 104. The server-side code 502 may interact with a scriptable object 504 included in the back-end Flow API 110. For example, the server-side code 502 may execute 506 a call to the Call Flow API (e.g., Function 1) included in the scriptable object 504. In turn, the scriptable object 504 may then dispatch 508 call to the processing engine 464.

The processing engine 464 may process the dispatch 508 to execute the chosen flow object(s) 300, such as by executing an Action and then returning 510 an ExecutionID representative of a "handle" or "pointer" to the Action being executed. The processing engine 464 may execute the Action asynchronously, such as via a background thread. In the depicted embodiment, the server-side code 502 may then execute 512 the Check Action Execution Status API (e.g., Function 2) included in the back-end Flow API 110, for example, by using the returned 510 ExecutionID as input to the Check Action Execution Status API. That is, the server-side code 502 may check the status of execution to see if the Action has completed execution. A returned 514 status may inform the server-side code 502 that the Action has not completed execution.

Accordingly, the server-side code 502 may wait and then again execute 516 the Check Action Execution Status API (e.g., Function 2) included in the back-end Flow API 110, for example, by using the returned 510 ExecutionID. A returned 516 status may now inform the server-side code 502 that the Action has completed execution. To receive the outputs of the Action's execution, the server-side code may then execute 520 the Retrieve Action Outputs API (e.g., Function 3) included in the back-end Flow API 110, for example, by using the returned 510 ExecutionID. The Retrieve Action Outputs API may then return 522 an array of output arguments derived by executing the Action. In certain embodiments, the server-side code 502 and/or the scriptable object 504 may be implemented for execution via Rhino, a JavaScript engine written fully in Java and managed by the Mozilla Foundation. In other embodiments, the server-side code 502 and/or the scriptable object 504 may be implemented in Java, Python, C, C++, and so on, executable by a variety of back-end engines.

Figure 8:
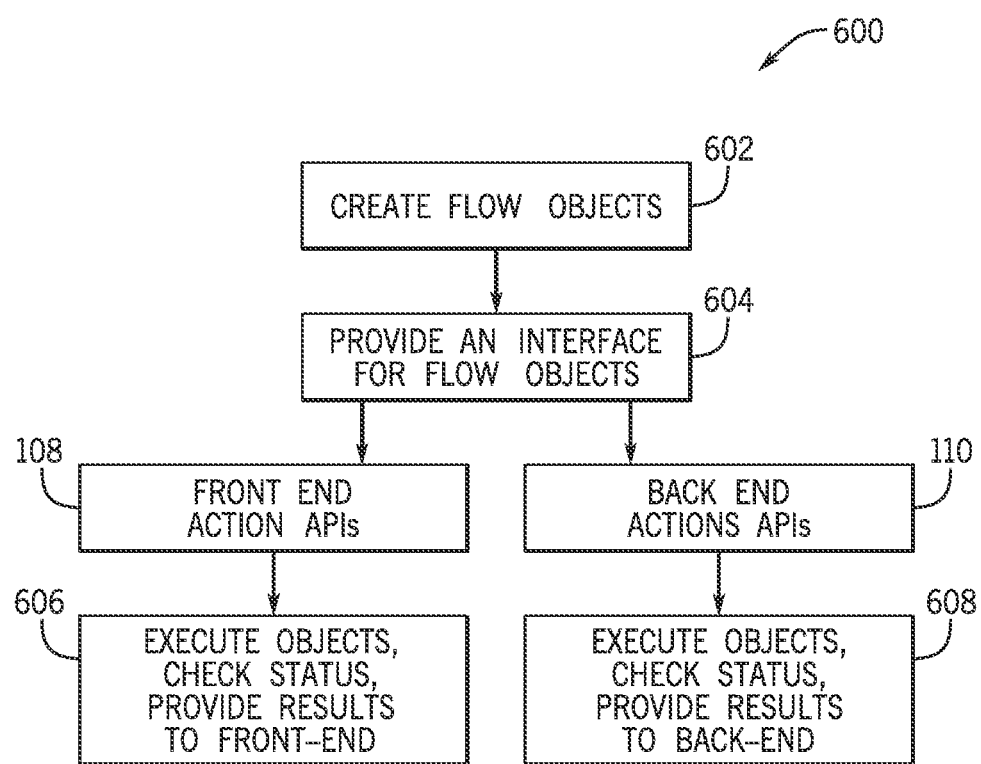
FIG. 8 it's is a flowchart of an embodiment of a process suitable for creating one or more flow objects and for interfacing with the one or more flow objects via front-end and back-end flow APIs.

FIG. 8 is a flowchart of an embodiment of a process 600 that may be used to create custom flow objects 300, such as flows, sub-flows, and Actions, which may then be reused via the. The process 600 may be implemented as computer instructions or code executable via the processor(s) 202 and stored in the memory 206. The process 600, for example, may be executed via the flow data processing system 106. In the illustrated embodiment, the process 600 may create (block 602) one or more flow objects 300. For example, the flow designer system 302 may be used to create (block 602) the one or more flow objects 300.

The process 600 may then provide an interface (block 604) for the flow objects 300. In the depicted example, two interfaces are provided. A first interface may include the front-end Flow APIs 108, and a second interface may include the back-end Flow APIs 110. As mentioned above, the front-end Flow APIs 108 may interface with the flow objects 300 to execute the objects 300, check the status of execution of the objects 300, and to retrieve results (block 606) to the front-end client 322. Likewise, the back-end Flow APIs 110 may interface with the flow objects 300 to execute the objects 300, check the status of execution of the objects 300, and to retrieve results (block 608) to the back-end client 324.

Figure 9:
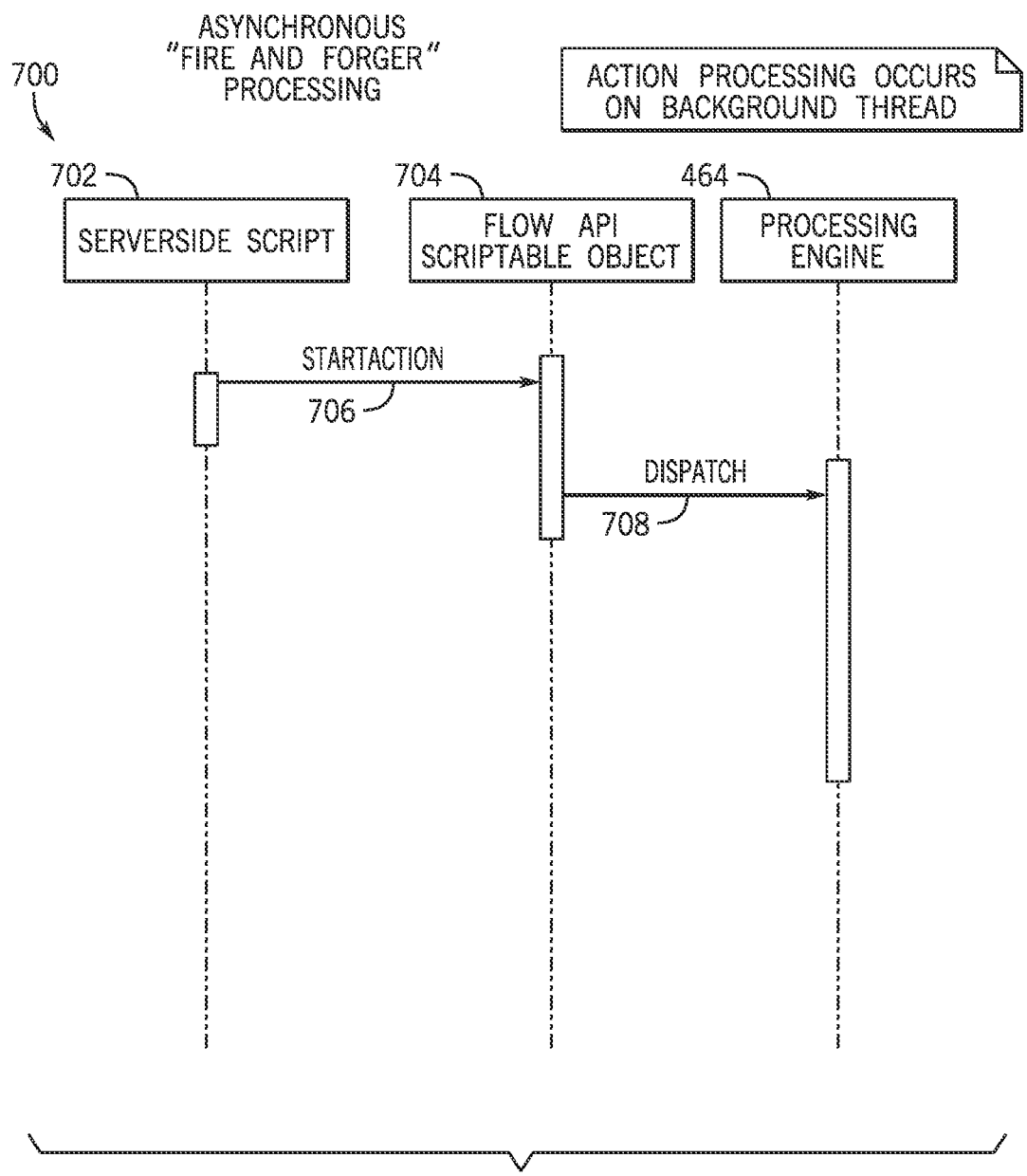
FIG. 9 is an interaction overview diagram illustrating embodiments of asynchronous interactions between certain components of back-end flow APIs and a server-side code.

FIG. 9 is an interaction overview diagram illustrating embodiments of "fire and forget" interactions 700 between certain components of the back-end Flow API 110 and a server-side code 702. The server-side code 702 may be executable by the back-end client 324, for example, via the servers 26 and/or 104. The server-side code 702 may interact with a scriptable object 704 included in the back-end Flow API 110. For example, the server-side code 702 may execute 706 a call to the Call Flow API (e.g., Function 1) included in the scriptable object 704. In turn, the scriptable object 504 may then dispatch 708 the call to the processing engine 464. Because of the "fire and forget" nature of processing, after the execution 706 the server-side code 702 may continue execution without, for example, waiting for results. As mentioned earlier, the server-side code 702 may then periodically check for execution status and then retrieve results when execution of the API call is completed. In certain embodiments, the server-side code 702 and/or the scriptable object 704 may be implemented for execution via Rhino, a JavaScript engine written fully in Java and managed by the Mozilla Foundation. In other embodiments, the server-side code 702 and/or the scriptable object 704 may be implemented in Java, Python, C, C++, and so on, executable by a variety of back-end engines.

Figure 10:
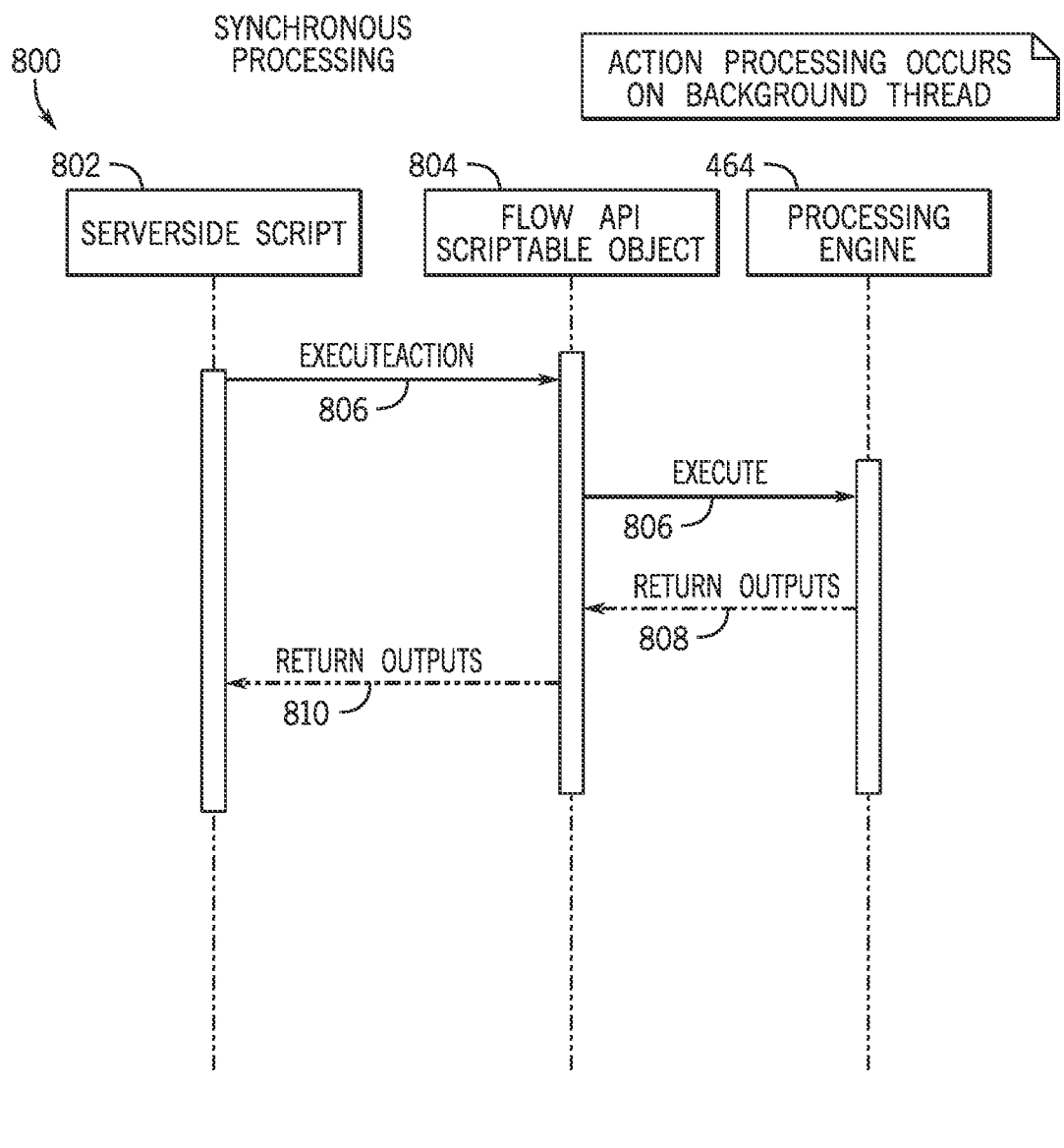
FIG. 10 is an interaction overview diagram illustrating embodiments of synchronous interactions between certain components of back-end flow APIs and a server-side code.

FIG. 10 is an interaction overview diagram illustrating embodiments of synchronous interactions 800 between certain components of the back-end Flow API 110 and a server-side code 802. The server-side code 802 may be executable by the back-end client 324, for example, via the servers 26 and/or 104. The server-side code 802 may interact with a scriptable object 804 included in the back-end Flow API 110. For example, the server-side code 802 may execute 806 a call to the Call Flow API (e.g., Function 1) included in the scriptable object 804. In turn, the scriptable object 804 may then execute 808 the call to the processing engine 464. Because of the synchronous nature of processing, after the execution 806, the scriptable object 804 may wait for results from the processing engine 464.

The processing engine 464 may then return 808 results from the execution 806 of the call. Likewise, the server-side code 802 may also wait for results from the scriptable object 804. Accordingly, the scriptable object 804 may return 810 results to the server-side code 802 that was waiting. Accordingly, both asynchronous and synchronous processing may be provide, with the synchronous example shown in FIG. 10. In certain embodiments, the server-side code 802 and/or the scriptable object 804 may be implemented for execution via Rhino, a JavaScript engine written fully in Java and managed by the Mozilla Foundation. In other embodiments, the server-side code 802 and/or the scriptable object 804 may be implemented in Java, Python, C, C++, and so on, executable by a variety of back-end engines.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
one or more processors configured to execute stored instructions to cause the computing system to:
provide for asynchronous execution of a first information flow object and a second information flow object of a software program, wherein the first flow information object comprises a first flow, a first sub-flow, a first action, or a combination thereof, that is configured to execute entirely in a client computing device via a front-end application programming interface (API), and wherein the second information flow object comprises a second flow, a second sub-flow, a second action, or a combination thereof, that is configured to execute entirely in a remote server via a back-end API, and wherein the first information flow object interfaces with the second information flow object via the asynchronous execution by:
executing a first set of functions of the front-end API, wherein the first set of functions asynchronously call for an execution of the first information flow object;
executing a second set of functions of the back-end API, wherein the second set of functions asynchronously call for an execution of the second information flow object; and
retrieving output of the execution of the first set of functions and retrieving output of the execution of the second set of functions as results of the asynchronous execution.

2. The computing system of claim 1, wherein the one or more processors are configured to execute the stored instructions to cause the computing system to:
create, via a visual information flow creation tool, the first information flow object and the second information flow object.

3. The computing system of claim 2, wherein the one or more processors are configured to execute the stored instructions to cause the computing system to:
create, via the visual information flow creation tool, a flowchart having the first information flow object in lieu of entering text for a computer program when creating the first information flow object.

4. The computing system of claim 1, wherein the first set of functions asynchronously call for the execution of the first information flow object using a first unique identifier of the first information flow object, wherein the second set of functions asynchronously call for the execution of the second information flow object using a second unique identifier of the second information flow object, and wherein the output of the execution of the first set of functions is retrieved using the first unique identifier and the output of the execution of the second set of functions is retrieved using the second unique identifier.

5. The computing system of claim 1, wherein executing the first information flow object via the front-end API comprises asynchronously executing a Call Action function, a Call Sub-flow function, a Call Flow function, or a combination thereof, to execute the second information flow object.

6. The computing system of claim 5, wherein the asynchronously executing comprises executing, via an asynchronous message bus system of the remote server, the Call Action function, the Call Sub-flow function, the Call Flow function, or the combination thereof.

7. The computing system of claim 1, wherein retrieving the output comprises executing a Callback function when the execution of the first information flow object is complete, wherein the Callback function is disposed in a client-side script code.

8. The computing system of claim 1, wherein retrieving the output comprises executing a Retrieve Action function, a Retrieve Sub-flow function, a Retrieve Flow function, or a combination thereof, using a first unique identifier of the first information flow object or a second unique identifier of the second information flow object.

9. The computing system of claim 1, wherein the asynchronous execution comprises:
executing, via the back-end API, a Check Action function, a Check Sub-flow function, a Check Flow function, or a combination thereof, to determine when the second information flow object completes execution.

10. The computing system of claim 1, wherein the asynchronous execution comprises:
verifying that suitable permissions exist to execute the first information flow object before executing the first set of functions to asynchronously call for the execution of the first information flow object, and verifying that suitable permissions exist to execute the second information flow object before executing the second set of functions to asynchronously call for the execution of the second information flow object.

11. The computing system of claim 10, wherein the suitable permissions are verified using an access control list.

12. The computing system of claim 1, wherein the first flow includes the first sub-flow, the first sub-flow includes the first action, and the first flow does not provide an output.

13. A method, comprising:
providing for asynchronous execution of a first information flow object and a second information flow object of a software program, wherein the first flow information object comprises a first flow, a first sub-flow, a first action, or a combination thereof, that is executed entirely in a client computing device via a front-end application programming interface (API), and wherein the second information flow object comprises a second flow, a second sub-flow, a second action, or a combination thereof, that is executed entirely in a remote server via a back-end API, and wherein the first information flow object interfaces with the second information flow object via the asynchronous execution by:
executing a first set of functions of the front-end API, wherein the first set of functions asynchronously call for an execution of the first information flow object via a first unique identifier of the first information flow object;
executing a second set of functions of the back-end API, wherein the second set of functions asynchronously call for an execution of the second information flow object via a second unique identifier of the second information flow object; and
retrieving output of the execution of the first set of functions and retrieving output of the execution of the second set of functions as results of the asynchronous execution.

14. The method of claim 13, comprising:
verifying permissions to execute the first information flow object in an access control list before executing the first set of functions to asynchronously call for the execution of the first information flow object; and
verifying permissions to execute the second information flow object in the access control list before executing the second set of functions to asynchronously call for the execution of the second information flow object.

15. The method of claim 13, comprising:
executing, via the back-end API, a Check Action function, a Check Sub-flow function, a Check Flow function, or a combination thereof, to determine when the second information flow object completes execution.

16. The method of claim 13, wherein retrieving the output of the execution of the first set of functions or retrieving the output of the execution of the second set of functions comprises:
executing a Callback function, a Retrieve Action function, a Retrieve Sub-flow function, a Retrieve Flow function, or a combination thereof, using the first unique identifier or the second unique identifier.

17. A non-transitory, computer-readable medium storing instructions executable by a processor of a computing system, wherein the instructions comprise instructions to:
provide for asynchronous execution of a first information flow object and a second information flow object of a software program, wherein the first flow information object comprises a first flow, a first sub-flow, a first action, or a combination thereof, that is executed entirely in a client computing device via a front-end application programming interface (API), and wherein the second information flow object comprises a second flow, a second sub-flow, a second action, or a combination thereof, that is executed entirely in a remote server via a back-end API, wherein the first information flow object interfaces with the second information flow object via the asynchronous execution, and wherein the instructions to provide the asynchronous execution comprise instructions to:
verify permissions to execute the first information flow object;
execute a first set of functions of the front-end API, wherein the first set of functions asynchronously call for an execution of the first information flow object via a first unique identifier of the first information flow object;
verify permissions to execute the second information flow object;
execute a second set of functions of the back-end API, wherein the second set of functions asynchronously call for an execution of the second information flow object via a second unique identifier of the second information flow object; and
retrieve output of the execution of the first set of functions using the first unique identifier and retrieve output of the execution of the second set of functions using the second unique identifier as results of the asynchronous execution.

18. The medium of claim 17, wherein the instructions comprise instructions to:
create, via a visual information flow creation tool, the first information flow object from a first flowchart and create the second information flow object from a second flowchart based on inputs received from a user.

19. The medium of claim 17, wherein the instructions to retrieve the output comprise instructions to:
    execute a Callback function, a Retrieve Action function, a Retrieve Sub-flow function, a Retrieve Flow function, or a combination thereof, using the first unique identifier or the second unique identifier.

20. The medium of claim 17, wherein the permissions to execute the first information flow object and the permissions to execute the second information flow object are verified using an access control list.

\* \* \* \* \*